May 19, 1925.  
H. F. KRAUSE  
ANIMAL TRAP  
Filed March 12, 1924   2 Sheets-Sheet 1
1,538,707
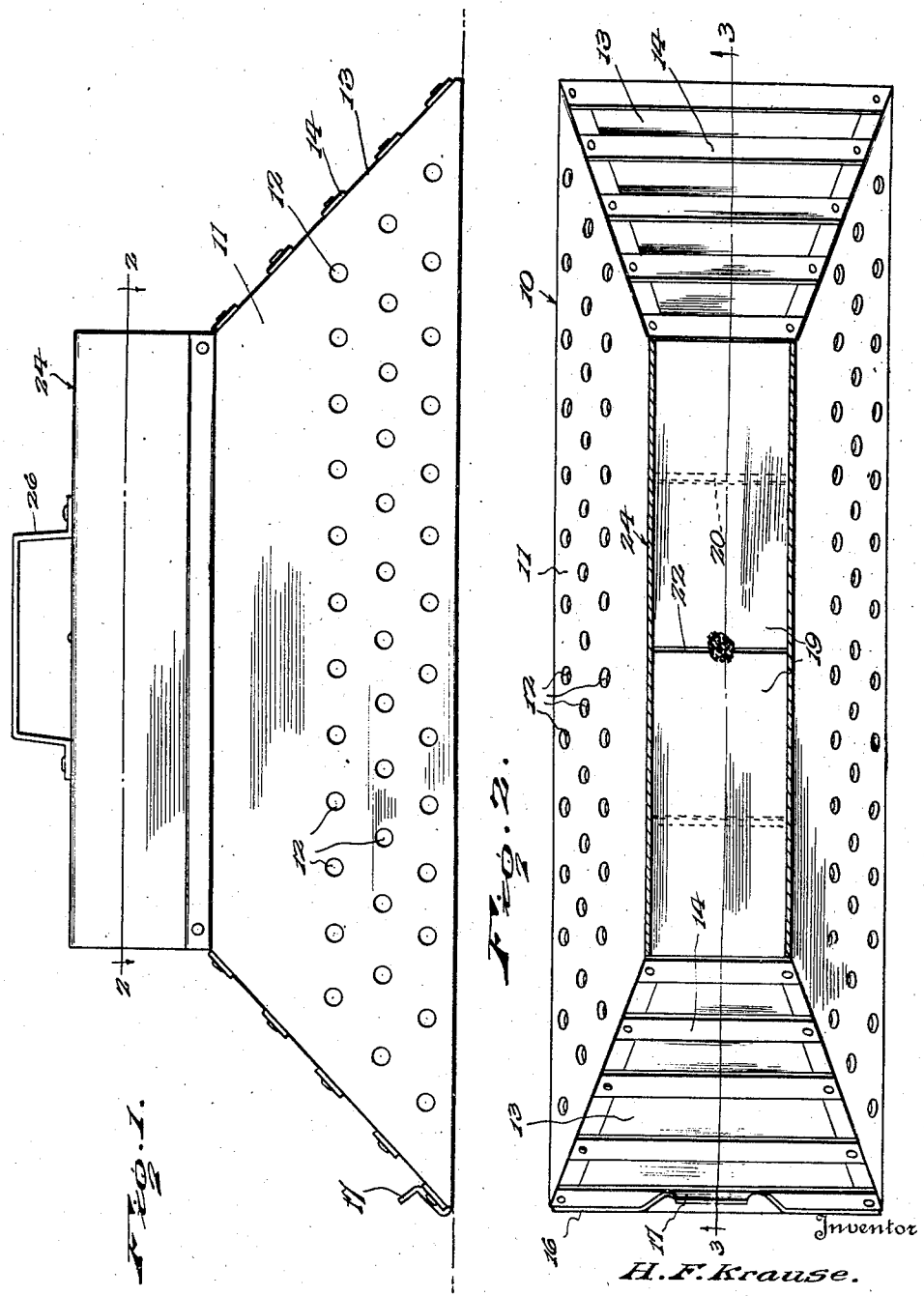

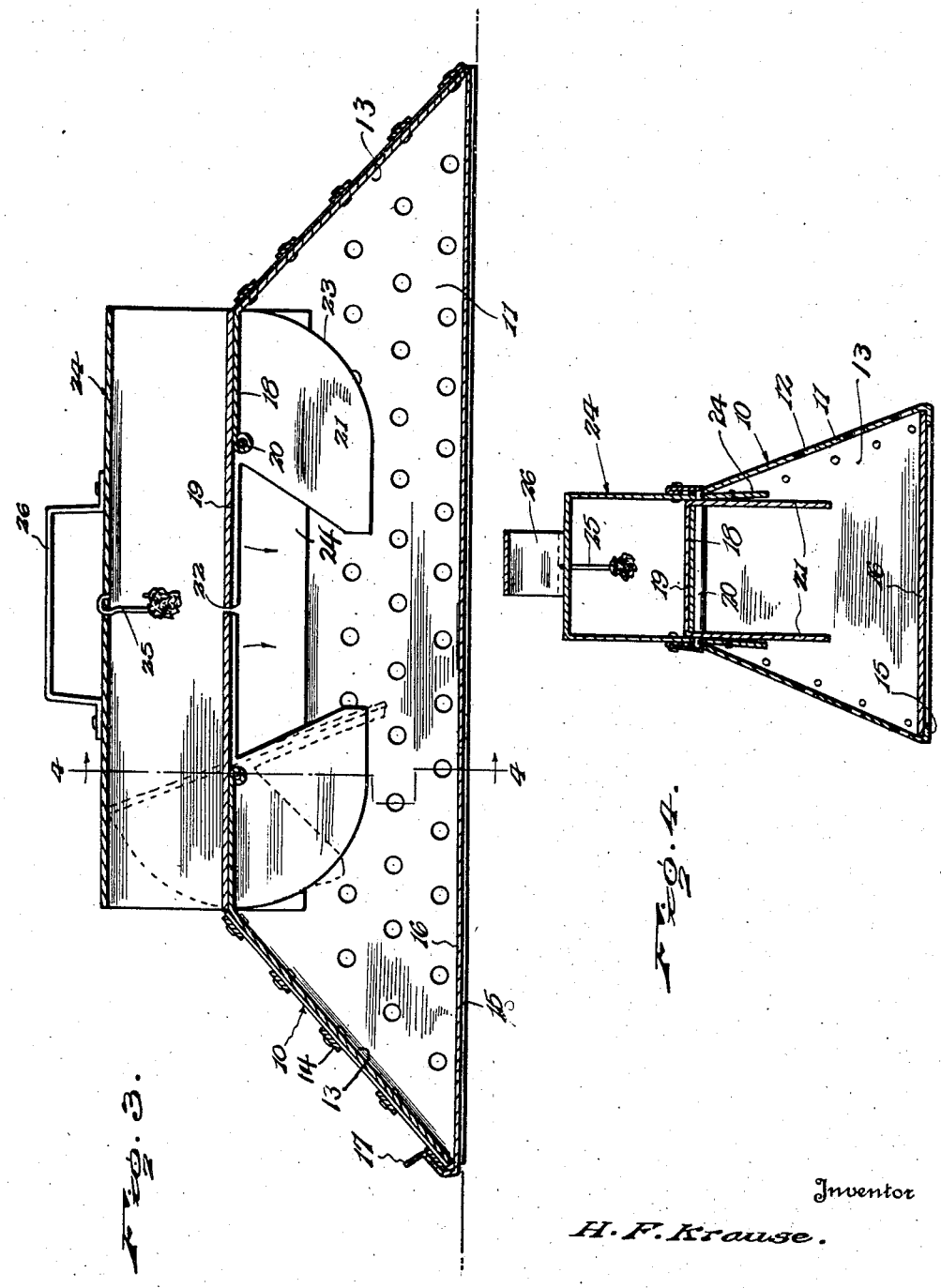

Patented May 19, 1925.

1,538,707

UNITED STATES PATENT OFFICE.

HENRY F. KRAUSE, OF SCHULENBURG, TEXAS.

ANIMAL TRAP.

Application filed March 12, 1924. Serial No. 698,734.

*To all whom it may concern:*

Be it known that I, HENRY F. KRAUSE, a citizen of the United States, residing at Schulenburg, in the county of Fayette and State of Texas, have invented certain new and useful Improvements in Animal Traps, of which the following is a specification.

My invention relates to traps for catching animals, such as rats and mice, and the main object of the invention is to provide a trap of this character which remains set all the time ready to catch any rodents independent of how many have already been caught.

Another object of the invention is to provide a trap which will not only catch very small mice but also large rats.

The trap is very substantially constructed so that it cannot get out of order by constant usage or rough handling. It is perfectly sanitary and easy to empty for disposing of the trapped animals.

In the accompanying drawings, one embodiment of the invention is illustrated, and—

Figure 1 is a side elevation of the trap;

Figure 2 is a horizontal section along line 2—2 of Figure 1;

Figure 3 is a vertical section along line 3—3 of Figure 2; and

Figure 4 is a transverse section along line 4—4 of Figure 3.

In the drawings, reference numeral 10 represents the base of a trap which is made in the shape of a pyramidic frustum with its narrowest part upwards. The base has two longitudinal sides 11 which are preferably perforated, as at 12, to provide necessary ventilation in order to keep the trap in sanitary condition. These perforations also serve for admitting water if the caught animals are to be drowned in the trap. The two ends are closed by trapezoidal end plates 13 secured to the longitudinal sides 11, as by rivets or the like, and transversely on the two end plates 13 are secured slats 14 which correspond to rungs or steps on a ladder to facilitate the climbing up of the animals to reach the top of the trap. The upper ends of the trapezoidal end plates 13 extend inwardly to provide short bridges 18 partly covering the top opening in the base 10.

The box-shaped base 10 is open at the bottom and the longitudinal sides 11 are provided with narrow ledges 15 forming guides for a sliding floor 16 having a handle 17 at one end. This construction permits the sliding out of the floor 16 towards the left of Figures 1, 2 and 3 in order to dump the caught animals out of the trap.

The top opening in the base 10 is closed by means of two trap doors 19 hinged, as at 20, at the ends of the bridges 18. The outer ends of the trap doors have downwardly directed wings 21 forming counter-weights to insure the normal closing of the top opening in the base 10. The trap doors 19 are thus well balanced so that it requires only a very slight weight, as that of a small mouse, at the inner ends 22 of the trap doors, to tip the same. These ends 22 meet in the middle of the top opening of the base 10, as clearly seen in Figures 2 and 3 of the drawings. The outer edge 23 of each wing 21 is curved on a radius swung from the center of the hinge 20 so as to permit the free swinging up of the wings when the trap door is tipped, as indicated by dotted lines in Figure 3.

Over the top opening and over the trap doors 19 is furnished a drum or tunnel 24 extending the full length of the top of the trap. This drum is preferably rectangular or square in cross section and wide and high enough to permit the entry of large rats. In the middle of the drum is suspended a hook 25 adapted to carry the bait, preferably exactly above the meeting edges 22 of the trap doors 19. In order to facilitate the transportation of the trap, whether filled or empty, a handle 26 is provided on top of the drum 24, as seen in Figures 1, 3 and 4.

With the trap baited and set up in a place where the animals congregate, the latter will be attracted by the bait and try to approach the same by ascending the ladder formed by the rungs 14 and arrive on the flat surface of the trap doors 19, both of which are level when the trap is set. It is evident that rats may approach the bait from either side of the trap and in this manner two rats may enter the drum at the same time but from different ends of the trap. In order to reach the bait the rat will have to advance along the trap door 19 and directly it has passed the hinge 20, its weight will overbalance the trap door which will swing into the dotted line position shown in Figure 3 and deposit the rat in the base of the trap. The trap door 19 will thereupon immediately close. As it can swing only downwardly at its inner edge 22, there is not the slightest possibility of the rat, caught in the trap, escaping therefrom, the trap door being held from swinging in the opposite direction by its rear portion resting upon the bridge 18.

As the bait on the hook 25 is placed in such a position that it cannot be reached unless the animal is near the edge 22 of the trap door, it is clear that the bait will be undisturbed as the trap swings immediately the animal approaches this edge. Accordingly, the trap need not be baited more than, say, once a day or until the bait has lost its attraction for the animals.

When one or more animals have been caught in the trap, the trap may be lowered in a basin of water in order to drown them as the water can easily enter through the apertures 12 to fill the trap. Finally, the sliding floor 16 is removed for dumping out the animals caught in the trap. As the trap is then wide open at its under side, it is very easily cleaned whereupon it may again be baited and the bottom replaced thereby placing it in condition to be set up for further use.

Upon reference to Figs. 3 and 4, it will be noted that the side walls of the tunnel extend down into the base between the sides of the same and that the wings of the doors extend through the bridges immediately adjacent the lower portions of the side walls of the tunnel. This construction and arrangement causes the wings to serve as guides for the doors as well as counterweights for the same so that lateral movement of the doors is effectually prevented and bending of the hinge pins or pivots of the doors is obviated. It will, of course, be understood that the bridges serve also as braces and as a result a very strong structure is attained which is at the same time very cheap and durable.

The trap has been shown as constructed of metallic plate such as galvanized iron, but it is evident that other material such as wood, fiber or the like may be used.

Having thus described the invention, what is claimed as new is:

An animal trap comprising a base open at top and bottom, bridges extending from the top edges of the end walls of the base inwardly between the side walls thereof, a removable floor plate normally closing the bottom of the base, a tunnel secured on top of the base and having its side walls depending into the base through the bridges, doors hinged between their ends at the inner edges of the bridges, the outer portions of the doors normally resting on the bridges and the inner portions thereof normally closing the top of the base, wings depending from the sides of the outer portions of the doors and extending through the bridges immediately adjacent the side walls of the tunnel, and a bait holder in the tunnel.

In testimony whereof I affix my signature.

HENRY F. KRAUSE. [L. S.]